United States Patent [19]

Susnjara

[11] Patent Number: 5,331,330
[45] Date of Patent: Jul. 19, 1994

[54] APPARATUS AND METHOD FOR DETECTING AND DISPLAYING LIGHTNING

[76] Inventor: Kenneth J. Susnjara, 115 Joy Dr., Santa Claus, Ind. 47579

[21] Appl. No.: 63,868

[22] Filed: May 18, 1993

[51] Int. Cl.[5] .............................................. G01S 3/02
[52] U.S. Cl. ..................................... 342/460; 342/26; 342/182
[58] Field of Search ................. 342/26, 460, 182, 183, 342/184

[56] References Cited

U.S. PATENT DOCUMENTS

| | | | |
|---|---|---|---|
| 4,023,408 | 5/1977 | Ryan et al. | 324/72 |
| 4,914,444 | 4/1990 | Pifer et al. | 342/460 |
| 4,972,195 | 11/1990 | Markson et al. | 342/460 |
| 5,049,886 | 9/1991 | Seitz et al. | 342/26 |
| 5,202,690 | 4/1993 | Frederick | 342/26 |

Primary Examiner—Mark Hellner
Attorney, Agent, or Firm—Lalos & Keegan

[57] ABSTRACT

A lightning detection and display system for aircraft is disclosed. A lightning detection system detects the bearing and distance of lightning strikes to the aircraft and the aircraft navigation system determines the aircraft position relative to earth. A computer then calculates the position of each strike relative to earth and displays the aircraft's position and lightning strike locations in their correct relative positions. While the aircraft moves, the computer periodically updates the display data to maintain an accurate depiction. The system stores a history of lightning strikes and displays such history in a time-lapse mode to represent the storm's trend in direction and magnitude.

14 Claims, 3 Drawing Sheets

APPARATUS AND METHOD FOR DETECTING AND DISPLAYING LIGHTNING

FIELD OF THE INVENTION

The present invention is related to lightning detection and display systems and more particularly to detection and display systems for use on aircraft.

BACKGROUND OF THE INVENTION

Conventional methods for detecting thunderstorms use radio waves created by lightning. These systems include antennas that detect radio frequency (RF) emissions from lightning to determine the occurrence and position of lightning associated with thunderstorms. A computerized electronic system determines the direction and distance between the lightning strikes and the aircraft. The lightning strikes are then depicted on a display that shows the relative position of the aircraft to the lightning strikes (i.e. thunderstorm). For example, see Ryan (U.S. Pat. No. 4,023,408) for a description of a lightning display system known as "Stormscope" and Markson (U.S. Pat. No. 4,972,195) for a description of an improved lightning range system.

In a conventional lightning display system for an aircraft, the display shows an aircraft symbol and the location of the lightning strike with respect to the aircraft. The aircraft operator can select the range in which lightning strikes will be displayed. The lightning strike depiction remains on the display after the strike is over so that a collection of these strikes depicted in a particular area indicates that a thunderstorm is present.

Conventional systems have certain drawbacks. For example, when the aircraft turns, the depicted lightning strike appears in the same relative position it had with the aircraft when the strike occurred and not the new relative position it has with the aircraft on the new heading. A method commonly employed to compensate for this shortcoming is to connect and correlate the lightning detection system to the aircraft heading indicator so that as the aircraft turns, the lightning display is rotated an equal number of degrees in order to maintain the same angular relationship between the aircraft and the strike.

Another shortcoming of the prior art is that as the aircraft moves, the lightning strike depiction maintains the same relative positional or distance relationship with the aircraft that existed when the strike occurred and not the true positional relationship with the aircraft in its new location.

BRIEF SUMMARY OF THE INVENTION

The present invention overcomes certain drawbacks in the prior art by recording the position of the lightning strikes relative to the earth, i.e. as a function of latitude and longitude. Then, the lightning strikes are displayed in their correct position relative to the aircraft as the aircraft moves.

In addition to the lightning strike distance and bearing to the aircraft, additional information about the thunderstorm would be valuable to the user. This information includes speed and direction of movement of the storm as well as information about whether the storm is increasing or decreasing in intensity, The present invention utilizes a computer to analyze inputs from a lightning detection system, an aircraft heading system, and an aircraft navigational system. The computer uses the inputs to compute the position of the lightning strikes relative to the earth and to display the strikes in their proper position relative to the aircraft in its current location. The display is updated periodically to accurately depict the position of the aircraft and the relative position of the thunderstorm as indicated by the lightning strikes. The present invention utilizes a memory for recording a history of lightning strikes over time and for displaying such history at an increased rate to represent the intensity and movement of the thunderstorm over time.

In operation, the lightning detector detects and reports the bearing and range of lightning relative to the aircraft. The aircraft heading system detects and reports the heading of the aircraft. The aircraft navigation system determines and reports the position of the aircraft relative to the earth, i.e. as a function of latitude and longitude. With this information, the computer can then compute and store the location of a large number of lightning strikes. The location of each strike is computed with a fixed reference, i.e. latitude and longitude on earth, rather than with a changing reference, i.e. relative to the airplane.

The lightning strike data, stored in the computer, can be displayed in a number of modes. The computer is programmable to select a geographical area surrounding the aircraft position for the display area. Within that geographical display area, an aircraft symbol is depicted at its present latitude and longitude. Similarly, the lightning strikes are displayed at their detected latitude and longitude within the display area. Since the aircraft position and the lightning strike positions are defined within the same fixed reference, i.e. relative to earth, then their relative positions on the display will remain correct even as the airplane moves. The geographic area displayed is simply rotated so that the up direction corresponds to the current aircraft heading. The advantage of such system is that the aircraft operator views the lightning strikes in their correct position relative to the aircraft even when the aircraft changes its heading and position.

For example, consider an airplane travelling North at 38 deg. 42 min. North, 78 deg. 8 min. West (location of the Patent & Trademark Office) and a lightning strike occurring 38 deg. 47 min. North, 78 deg. 1 min. West (location of the Capitol). The strike is detected by the lightning detection system and the bearing and distance of the strike relative to the aircraft is reported to the computer. The computer obtains the absolute position (i.e. relative to the earth) of the aircraft from the aircraft navigation system. The computer then calculates the absolute position (relative to the earth) of the lightning strike by adding the lightning bearing and range information (i.e. position relative to the aircraft) to the absolute position of the aircraft. The computer stores the absolute position of the lightning strike for concurrent or subsequent display. The computer updates the geographic display area using information from the aircraft heading system and navigation system to account for the movement of the aircraft. The lightning strike position will always be correctly depicted within the geographic display area because the location data is calculated relative to the "fixed" earth reference ("absolute" location) rather than the moving aircraft reference. Accordingly, the display will continue to correctly depict the lightning strike at 38 deg. 47 min. North, 78 deg. 1 min. West while the aircraft continues to move North. Thus, the pilot can easily observe and avoid, if necessary, the storm in the Capitol area.

Another advantage of the present invention is the ability to store and display the storm's history. By storing a large number of strikes over time and then displaying them chronologically at high speed (i.e. in a time-lapse manner), the movement and intensity trend can be observed.

DETAILED DESCRIPTION

Figure 1:
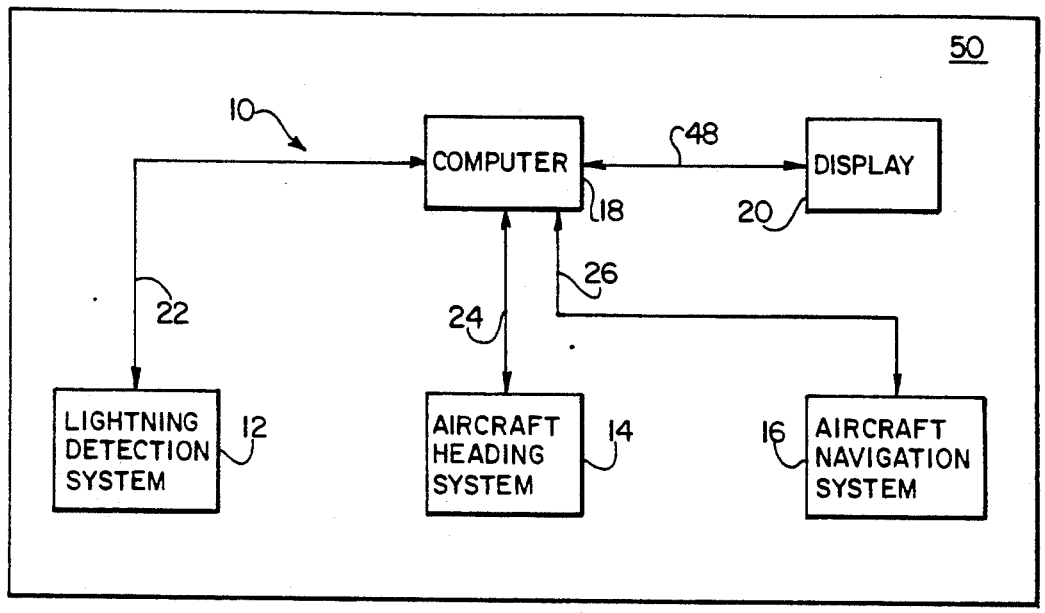
FIG. 1 is an illustration of the functional block diagram of the lightning detection and display system of the present invention.

FIG. 1 illustrates a functional block diagram of the aircraft lightning detection and display system 10 of the present invention. The system 10 includes a lightning detection system 12, an aircraft heading system 14, an aircraft navigation system 16, a computer 18, and a display 20, each housed within aircraft 50. The lightning detection system 12 is conventional and may operate on known principles such as disclosed in the prior art. See, for example, Ryan, U.S. Pat. No. 4,023,408 and Markson et al, U.S. Pat. No. 4,972,195, which patents are incorporated herein by reference. The lightning detection system 12 supplies the distance and bearing (in relation to the aircraft) of lightning strikes detected on a real-time basis to computer 18 via line 22. Concurrently, aircraft heading system 14 supplies computer 18 with the aircraft's present heading via line 24. The aircraft heading system is conventional and can comprise a slaved compass or a directional gyro that drives a heading indicator or horizontal situation indicator (HSI).

Also operating concurrently, aircraft navigation system 16 provides the aircraft's current location relative to the earth, i.e. latitude and longitude. For the purposes of this discussion, the location of the aircraft or lightning strike relative to the earth will be called the "fixed-reference" locations since the position of the earth, for the time durations of interest in this application, is fixed. The location of the lightning strikes relative to the aircraft will be called "moving-reference" locations since the advantages of the present invention are most often realized when the aircraft is in flight. The aircraft's latitude and longitude are provided on a real-time basis to computer 10 via line 26. Navigation system 16 is conventional and may be, for example, a Long Range Navigation system (i.e. Loran C) or Global Positioning System (GPS). The lightning strike data is transferred on line 48 to display 20, which may be a conventional cockpit display unit (CDU) on an aircraft control panel.

Figure 2:
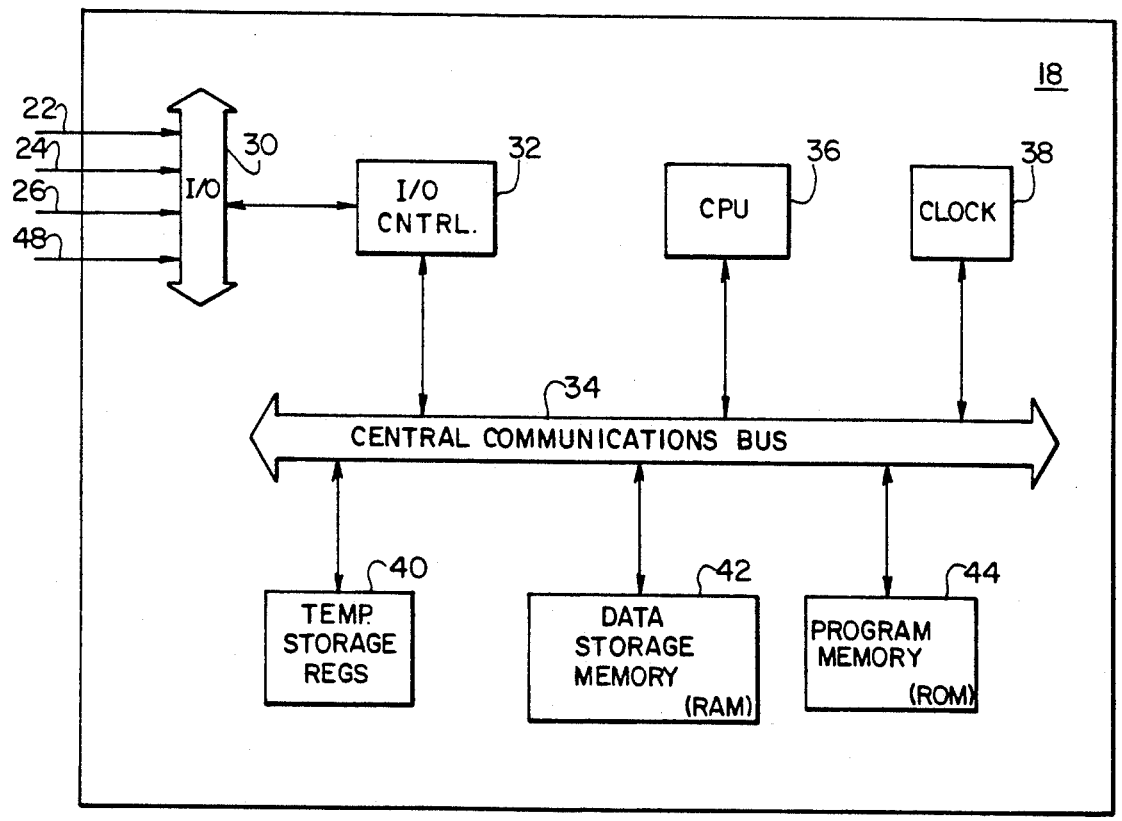
FIG. 2 is a functional block diagram of a computer used in the present invention.
Figure 3:
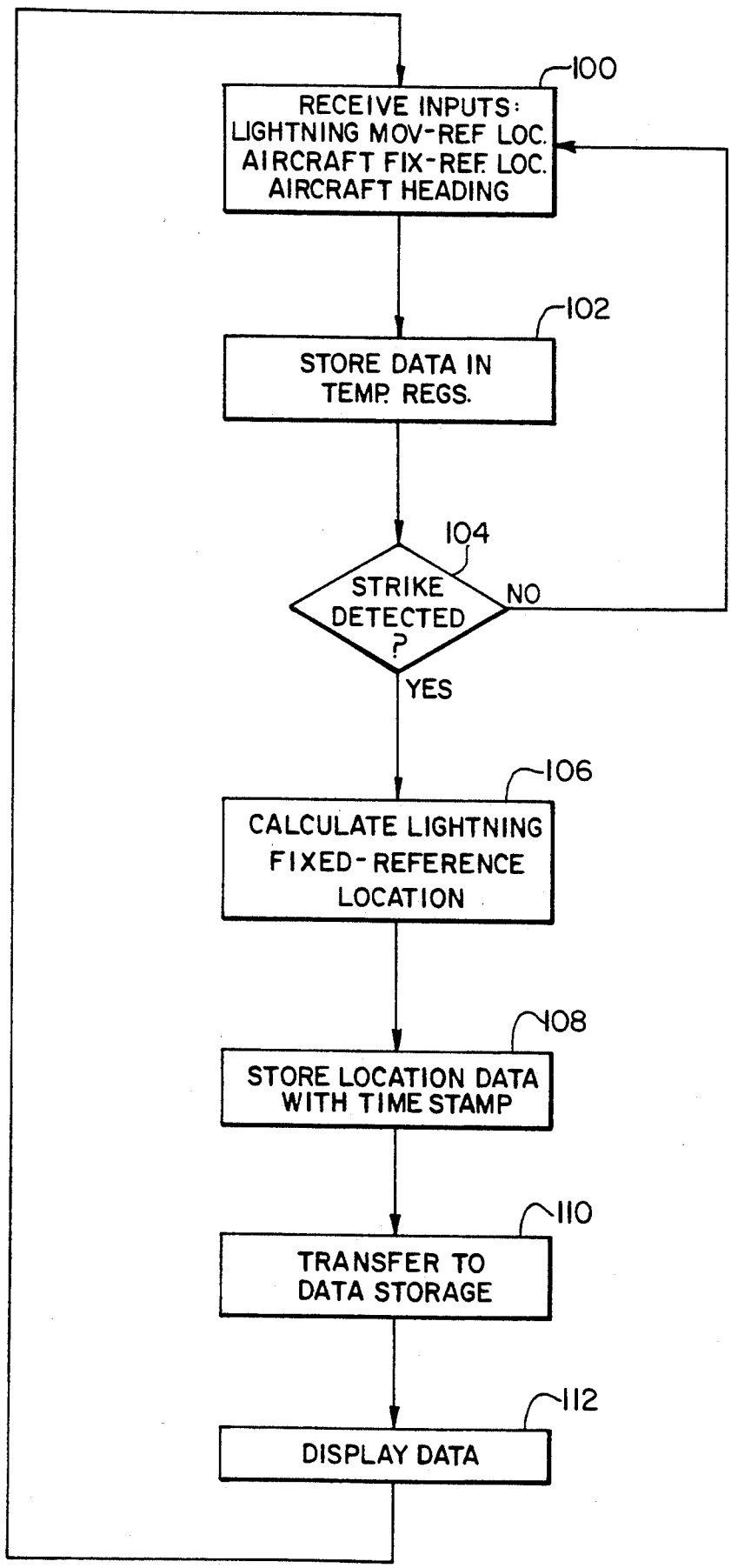
FIG. 3 is a general flow chart of the software system of the present invention.

As mentioned above, all inputs from systems 12, 14 and 16 are input to computer 18 on a real-time basis. FIG. 2 illustrates the basic components of computer 18 and FIG. 3 illustrates the general program flow of computer 18. Computer 18 may be any conventional programmable computer. Software techniques for programming computer 18 are well known in the art and need not be discussed in detail herein.

Referring to FIG. 2, inputs on lines 22, 24 and 26 and 48 are received by computer 18 on input/output (I/O) bus 30. Lines 22, 24, and 26 are bidirectional to carry control and timing signals from computer 18 to systems 12, 14 and 16. Data, control and timing signals are transferred between computer 18 and display 20 on line 48. Lines 22, 24, 26 and 48, in practice, may actually each comprise one or more multi-wire cables. Input/output (I/O) controller 32 provides the interface between computer 18 and external system components, Central communications bus 34 is the main internal path for signal transfer between major components of computer 18. These components include central processing unit (CPU) 36 that performs instruction execution and arithmetic/logic functions, central and real time clock 38 that provides synchronization and time-of-day signals, temporary storage registers 40, data storage memory 42, which may be a random-access memory (RAM), and program storage memory 44, which may be a read-only memory (ROM).

The system program, shown generally in flowchart form in FIG. 3, will be stored in memory 44. Referring to FIG. 3, at step 100, computer 18 receives inputs from each of systems 12, 14 and 16. At step 102, data representative of each of these inputs is stored in temporary storage registers 40.

Figure 4:
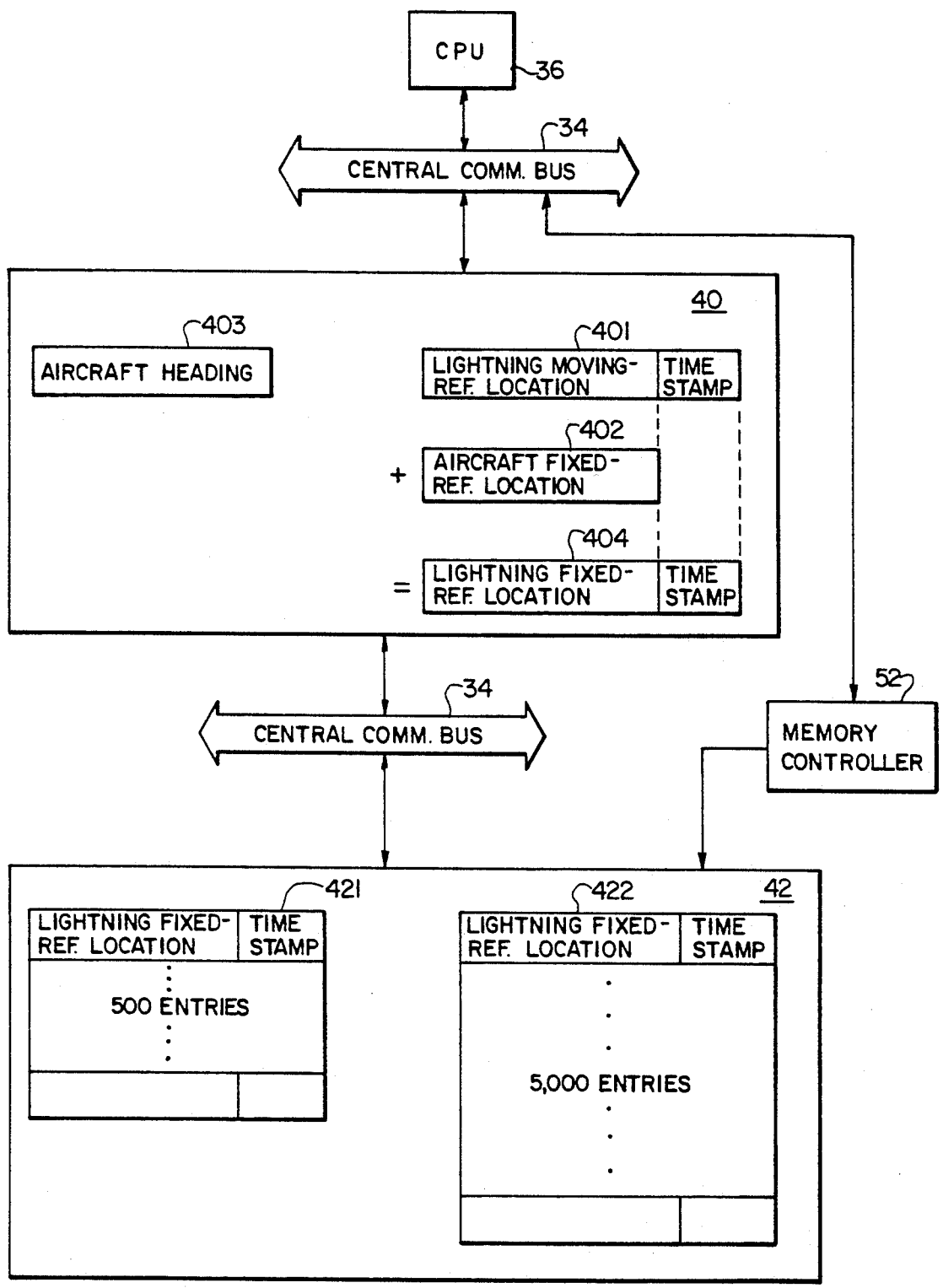
FIG. 4 is a functional block diagram of the data storage memory utilization in the present invention.

FIG. 4 shows one example of the memory storage utilization during the process shown in FIG. 3. All operations will be under control of the CPU 36. For example, data representative of the lightning strike is stored in temporary register 401. The data stored in register 401 represents the location of the lightning strike (if one is detected) relative to the aircraft. This will be referred to as the "lightning moving-reference location". Also stored in register 401 is the time (time stamp) that the lightning strike is detected. This information is provided by real-time clock 38, which is conventional. The data stored in register 402 represents the current location of the aircraft (i.e. its latitude and longitude) and will be referred to as the "aircraft fixed-reference location", The current aircraft heading is stored in register 403. The aircraft heading and location will also be continually fed to the aircraft's control, navigational and display systems, which are conventional and will not be discussed in detail herein.

Referring again to FIG. 3, at step 104, the system checks to see if a lightning strike was detected when the inputs were received at step 100. If no lightning was detected then no data is stored in register 401 during the current processing cycle and the program loops back to receive inputs during the next cycle. Cycle times will depend on the particular computer selected and its processing speed capabilities. If lightning was detected, then at step 106, the lightning location with reference to earth is calculated. At step 108, this lightning "fixed-reference" location is stored in register 404, along with a "time-stamp" that identifies the time of day that the strike was detected. This time-stamp is provided by accessing real time-of-day clock 38 in synchronization with the lightning detection system.

With reference to FIG. 4, the lightning fixed-reference (i.e. relative to the earth) location is calculated by "adding" the data stored in register 401 to the data stored in register 402. In actual practice, several steps will be required to "add" the data representing the aircraft's longitude and latitude to the data representing the lightning's distance and bearing to the aircraft. However, the principles of linear algebra for computing a vector sum are well known, as are the software techniques for programming such computation, and do not require any detailed discussion. Once computed, the lightning fixed-reference location is stored in temporary register 404. Again, FIG. 4 is simply a representation and in practice, register 404 may be an accumulator or the like in CPU 36 where the computation will be performed. The "time stamp" data will be transferred directly from register 401 to register 404, without modification.

At step 110 (FIG. 3), the data representing the lightning strike fixed-reference location and the time stamp data will be transferred to data storage 42. At step 112, the data is displayed. This display sequence and format will be discussed in greater detail hereinafter.

FIG. 4 illustrates an example memory structure and allocation for data storage 42. This structure is related to the lightning display modes provided by the present invention. The data from register 404 can be placed in two separate sections of data storage 42. In the example embodiment shown, a current memory section 421 and a historical memory section 422 are provided. Current memory 421 is the storage section that will be accessed during a primary display mode and historical memory 422 will be accessed during a secondary display mode.

In a primary display mode, a geographic area is defined around the aircraft's current latitude and longitude. A symbol representing the aircraft is then displayed at its current position within the geographical area. Each lightning strike stored in memory section 421 is also displayed at its recorded fixed-reference location (i.e. latitude and longitude) within the geographic area. Thus, the strikes will always appear in their correct relative position to the aircraft at its current location. The geographic area is rotated about the aircraft position so that the up direction corresponds to the current aircraft heading. Alternatively, the aircraft symbol can be rotated on a North-Up display. However, this form of presentation is more difficult for the operator to interpret. Techniques for displaying information on a CRT and the like are well known and a detailed discussion is not required herein.

In the primary display mode, a maximum number of lightning strikes will be displayed to reduce clutter and aid interpretation. For example, the capacity of memory section 421 can be limited to 500 entries. Therefore, when the display 20 is refreshed by the data in section 421 a maximum of 500 lightning strikes will be shown. Section 421 is structured as a circular buffer or pushdown stack. Once the buffer or stack is filled with 500 entries, the next newest lightning data (entering top of stack) will replace the oldest data (leaving bottom of stack). Since each entry also includes a time stamp, current memory section 421 can be periodically purged of entries that are obsolete. For example, entries that are over four minutes old are deleted so that only current or very recent conditions are displayed. Techniques for purging memories based upon age are well known in the art.

As mentioned previously, historical memory 422 (FIG. 4) is used in a second display mode. This mode permits the operator to view the history of the thunderstorm and thus observe its trend in movement and intensity. A large number of lightning data entries, e.g. 5,000, are stored in section 422. Section 422 is also designed as a push down stack but with 5,000 available memory locations rather than the 500 available in section 421. Once the data representing 5,000 lightning strikes is stored, the next newest strike will replace the oldest. In this second display mode, data entries in memory section 422 are displayed in chronological order (i.e. by their position on the stack) at high speed, e.g. 5,000 strikes per minute. In this mode, a fixed number, e.g. 100, of the oldest strikes are displayed in chronological order, i.e. oldest strike first, then the next, and so on. Once the fixed number (e.g. 100) of strikes is displayed, the oldest strike is removed from the display and replaced by the next strike on the stack (e.g. strike 101 replaces strike 1, then strike 102 replaces strike 2, and so on). This continues until all 5,000 strikes have been displayed. The screen is then blanked, if desired, and the display cycles through the historical memory again, starting with the oldest entry. The operator can observe the recent history of the thunderstorm in this "time lapse" mode, and can detect the general movement of the storm and whether it is increasing or decreasing in intensity. Since the lightning data in memory section 422 is also provided with a time stamp, these entries can also be purged of old data, e.g. any lightning strike data more than 4 minutes old. Memory sections 421 and 422 are shown in FIG. 4 as being physically separate. In practice, however, they may be the same physical memory which is accessed and addressed differently for each display mode. A memory controller 52 is provided to supply the necessary read/write, address and timing signals necessary for the storage and retrieval of data to and from memory 42. As is conventional, the data retrieved from memory 42 to refresh display 20 will determine the display format and sequence.

From the foregoing detailed description, it will be appreciated that the advantageous features of the present invention overcome certain deficiencies in the prior art and provide more accurate and useful information regarding thunderstorms. Adaptations of the present invention, which will be apparent to those having skill in the art, are intended to be within the scope of the present invention as defined by the following claims.

I claim:

1. A system for detecting lightning strikes from an aircraft and for displaying in said aircraft representations of said lightning strikes comprising:
   an aircraft;
   a computer housed within said aircraft;
   a lightning detection means housed within said aircraft for detecting lightning strikes and for providing signals representative of the distance and bearing of said detected lightning strikes to said aircraft, and means for connecting said lightning detection means to said computer;
   an aircraft navigation means housed within said aircraft for determining the location of said aircraft relative to earth and for providing signals representative of said location, and means for connecting said aircraft navigation means to said computer;
   said computer including means for calculating lightning strike locations relative to earth based upon said signals provided by said lightning detection means and said aircraft navigation means;
   said computer including memory means for storing said calculated lightning strike locations; and
   a display means for displaying said stored lightning strike locations, and means for connecting said display means to said computer.

2. A system as in claim 1 wherein said computer includes timing means for determining the time of day that said lightning strikes are detected.

3. A system as in claim 2 wherein said memory means includes means for storing said determined time of day for each detected lightning strike location.

4. A system as in claim 3 wherein said computer includes means for controlling the display of said lightning strike locations in the chronological order in which they were detected.

5. A system as in claim 4 wherein said computer includes means for displaying said lightning strike locations in chronological order at a rate greater than the real time rate of detection so that the display represents a movement and intensity trend of a thunderstorm associated with said detected lightning.

6. A system as in claim 5 wherein said memory means includes means for replacing oldest lightning locations stored in said memory means with newly detected lightning locations.

7. A system as in claim 6 wherein said computer includes means for controlling the display of said lightning location to replace the oldest displayed lightning location with a more newly detected lightning location.

8. A method for detecting lightning strikes from an aircraft and for displaying in said aircraft representations of said lightning strikes comprising the steps of:

detecting lightning strikes and determining the locations of said lightning strikes relative to an aircraft;

providing preliminary lightning strike location signals to a computer, said preliminary lightning strike location signals representing the distance and bearing of said detected lightning strikes to said aircraft;

determining the location of said aircraft relative to earth and providing aircraft location signals to a computer;

computing the location of said detected lightning strikes relative to earth based upon said preliminary lightning strike location signals and said aircraft location signals;

storing data representative of said computed lightning strike locations;

displaying data representative of said computed lightning strike locations.

9. A method as in claim 8 including the step of determining the time of day that said lightning strikes are detected.

10. A method as in claim 9 including the step of storing said determined time of day for each said computed lightning strike location.

11. A method as in claim 10 including the step of displaying said lightning strike locations in the chronological order in which they were detected.

12. A method as in claim 11 including the step of displaying said lightning strike locations in chronological order at a rate greater than the real time rate of detection so that the display represents a movement and intensity trend of a thunderstorm associated with said detected lightning strikes.

13. A method as in claim 12 including the step of replacing the oldest stored lightning strike locations with newly detected lightning strike locations.

14. A method as in claim 12 including the step of removing from display the oldest detected lightning strike location and replacing it with a more newly detected lightning strike location.

* * * * *